United States Patent
Amram et al.

(10) Patent No.: US 10,902,428 B1
(45) Date of Patent: Jan. 26, 2021

(54) MAINTAINING A RISK MODEL USING FEEDBACK DIRECTED TO OTHER RISK MODELS

(71) Applicant: EMC Corporation, Hopkinton, MA (US)

(72) Inventors: Shay Amram, Holon (IL); Alma Zohar, Ra'anana (IL); Anatoly Gendelev, Rechovot (IL); Christina Tkachenko, Tel Aviv (IL); Alex Zaslavsky, Petah Tiqwa (IL)

(73) Assignee: EMC IP Holding Company LLC, Hopkinton, MA (US)

(*) Notice: Subject to any disclaimer, the term of this patent is extended or adjusted under 35 U.S.C. 154(b) by 1038 days.

(21) Appl. No.: 14/970,903

(22) Filed: Dec. 16, 2015

(51) Int. Cl.
*G06Q 20/40* (2012.01)
*G06Q 20/10* (2012.01)
*G06Q 20/20* (2012.01)

(52) U.S. Cl.
CPC ................. *G06Q 20/4016* (2013.01)

(58) Field of Classification Search
CPC ...... G06Q 20/40; G06Q 20/405; G06Q 20/10; G06Q 20/20
USPC .......................................................... 705/44
See application file for complete search history.

(56) References Cited

U.S. PATENT DOCUMENTS

| | | | |
|---|---|---|---|
| 7,373,666 B2 | 5/2008 | Kaler et al. | |
| 8,280,833 B2 | 10/2012 | Miltonberger | |
| 8,572,391 B2 | 10/2013 | Golan et al. | |
| 8,925,058 B1 | 12/2014 | Dotan et al. | |
| 9,131,374 B1 | 9/2015 | Avni et al. | |
| 9,160,742 B1 | 10/2015 | Ackerman et al. | |
| 9,210,147 B1* | 12/2015 | Zilberberg | H04L 63/08 |
| 9,282,114 B1 | 3/2016 | Dotan et al. | |
| 2010/0023358 A1* | 1/2010 | Fox | G06Q 40/025 |
| | | | 705/38 |
| 2013/0132275 A1* | 5/2013 | Enzaldo | G06Q 40/02 |
| | | | 705/44 |

* cited by examiner

*Primary Examiner* — Hai Tran
(74) *Attorney, Agent, or Firm* — BainwoodHuang (57) ABSTRACT

Techniques of risk-based authentication involve adjusting a risk engine used by a recipient entity based on feedback acquired from multiple entities. Along these lines, both a recipient risk engine and one or more donor risk engines perform risk-based authentication for which respective feedback is generated. The feedback indicates whether certain transaction requests predicted to be fraudulent are confirmed to be fraudulent. The recipient risk engine is then adjusted based on the feedback created for itself, the feedback created for any of the donor risk engines, or some combination thereof.

15 Claims, 6 Drawing Sheets

Donor Risk Engine 110(1)
Risk Engine Accuracy Estimator 342(1)

Category 220(k)

| Bucket | Score | # True Pos | Cum True Pos | # False Pos | Cum False Pos |
|--------|-------|------------|--------------|-------------|---------------|
| 1      | 1200  | 30         | 0.789        | 1000        | 0.362         |
| 2      | 1000  | 7          | 0.973        | 890         | 0.684         |
| 3      | 12    | 1          | 1            | 870         | 1             |

Measure of Accuracy 330(k)(1)
    ROC AUC = 0.738

MAINTAINING A RISK MODEL USING FEEDBACK DIRECTED TO OTHER RISK MODELS

BACKGROUND

Risk-based authentication uses a risk model to predict whether transactions described in transaction requests received from a customer are fraudulent. Such transaction requests are characterized by values of various transaction factors (e.g., time of day, country of origin, transaction amount). The risk model receives these values of transaction factors and outputs a risk score, i.e., a number that indicates the likelihood that the transaction is fraudulent.

After a certain amount of time (e.g., a day), the transactions having the highest risk scores (e.g., top 1%) are selected for investigation by a customer. The customer provides feedback to the risk engine indicating whether these selected transactions—predicted to be fraudulent—were truly fraudulent. The risk model is then adjusted based on the feedback provided by the customer so that subsequent risk scores can be computed using the adjusted risk model.

SUMMARY

Unfortunately, there are deficiencies with the above-described conventional approach to risk-based authentication. For example, the feedback received for a customer's risk model may be scarce and learning may not always be sufficient to allow the risk model to make accurate predictions.

In contrast with the above-described conventional approach, improved techniques of risk-based authentication involve adjusting a risk engine used by one entity based on feedback acquired from multiple entities. Along these lines, both a recipient risk engine and one or more donor risk engines perform risk-based authentication for which respective feedback is generated. The feedback provides a measure of accuracy of that risk engine in predicting fraudulent transactions. The recipient risk engine is then adjusted based on the feedback created for itself, the feedback created for any of the donor risk engines, or some combination thereof.

Advantageously, the improved techniques make possible for a risk engine to make more accurate predictions of whether transactions are fraudulent even when its own feedback is limited. In an example, feedback created for donor entities is anonymized to prevent the recipient entity from learning about the donor entities and thus from receiving information considered to be private or confidential. Thus, one entity is able to benefit from feedback generated for other entities without a loss of privacy.

One embodiment is directed to a method of performing risk-based authentication. The method includes operating multiple risk engines, including one risk engine for each of multiple entities, each risk engine receiving transaction requests and generating respective predictions as to whether each of those transaction requests is fraudulent, operation of each risk engine resulting in respective feedback of that risk engine, the feedback providing a measure of accuracy of that risk engine in predicting fraudulent transaction requests, the multiple risk engines including a recipient risk engine of a recipient entity and at least one donor risk engine of at least one respective donor entity. The method also includes adjusting the recipient risk engine based on feedback resulting from operation of the at least one donor risk engine, thereby allowing the recipient risk engine to benefit from the feedback resulting from the operation of at least one donor risk engine.

Additionally, some embodiments are directed to a system constructed and arranged to perform risk-based authentication. The system includes memory and controlling circuitry constructed and arranged to carry out a method of performing risk-based authentication.

Further, some embodiments are directed to a computer program product having a non-transitory computer readable storage medium that stores instructions which, when executed by a computer, cause the computer to carry out the method of performing risk-based authentication.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of risk-based authentication involve adjusting a risk engine used by one entity based on feedback acquired from multiple entities. Advantageously, the improved techniques make it possible for a risk engine to make more accurate predictions of whether transactions are fraudulent even when feedback from the risk engine itself is limited.

Figure 1:
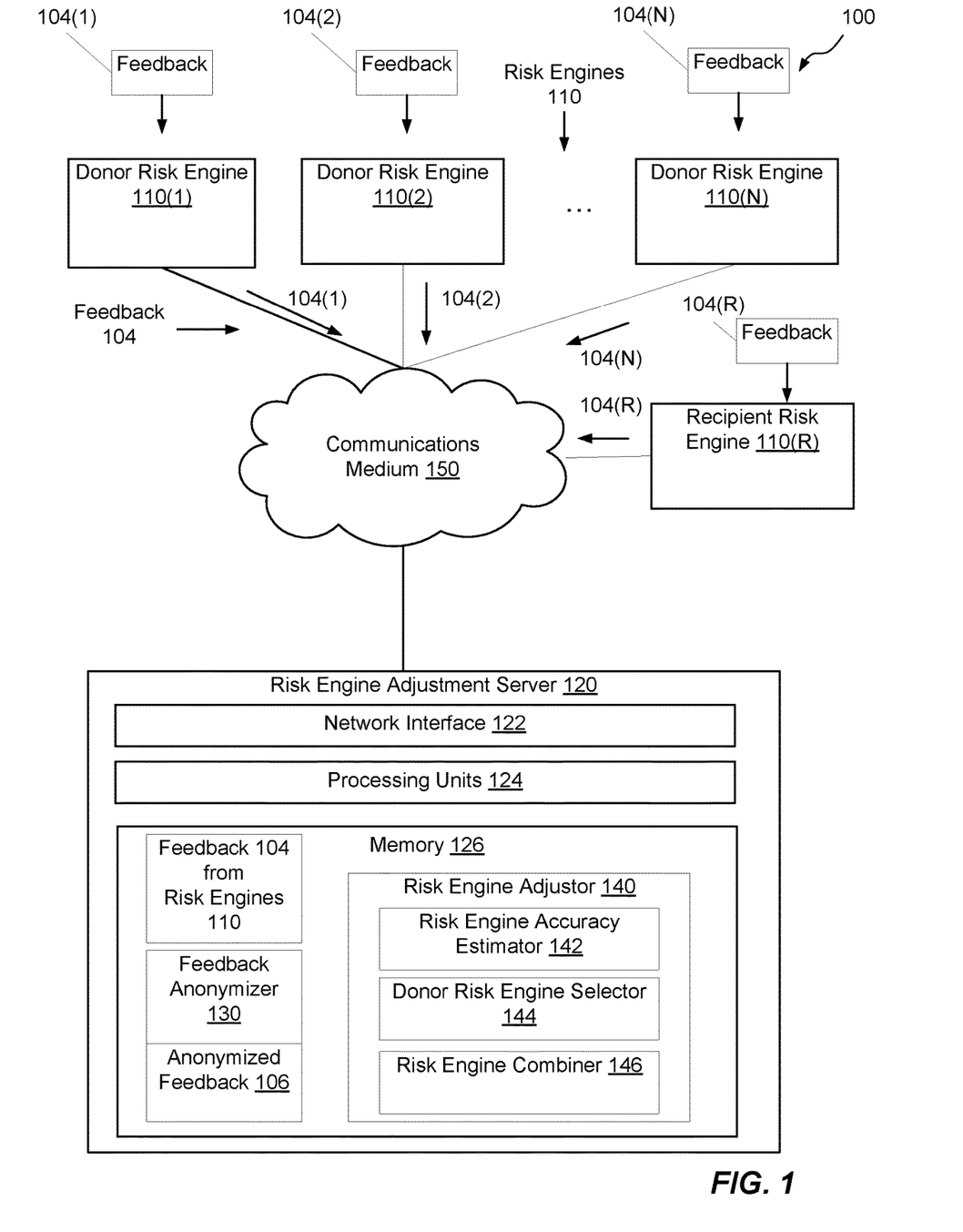
FIG. 1 is a block diagram illustrating an example electronic environment in which the improved technique can be carried out.

FIG. 1 shows an example electronic environment 100 in which embodiments of the improved techniques hereof can be practiced. Here, electronic environment 100 includes a set of donor risk engines 110(1), 110(2), ..., 110(N), a recipient risk engine 110(R), a risk engine adjustment server 120, and a communications medium 150.

Each of the donor risk engines 110(1), 110(2), ..., 110(N) and the recipient risk engine 110(R) is configured to receive transaction requests and predict whether those transaction requests are fraudulent. A risk engine, e.g., 110(1) may then send transaction requests predicted to be fraudulent to a respective human fraud analyst. In response, the human fraud analyst provides respective feedback 104(1) directed to risk engine 110(1). The feedback 104(1) indicates whether the transaction requests predicted to be fraudulent by risk engine 110(1) are confirmed to be fraudulent.

As illustrated in FIG. 1, the donor risk engines 110(1), 110(2), . . . , 110(N) and the recipient risk engine 110(R) are each implemented as separate computing devices. In this case, each device may be operated by a respective entity (e.g., a bank, a government agency, etc.) However, in other arrangements, the risk engines 110 may be implemented together within a single computer system, e.g., in a server environment.

The risk engine adjustment server 120 is configured to adjust recipient risk engine 110(R) based on any of feedback 104(1), 104(2), . . . , 104(N). As illustrated in FIG. 1, the risk engine adjustment server 120 is implemented as a server computer system that is in communication with the risk engines 110 over the communications medium 150. However, in other arrangements, the risk engines 110 may be co-located with the risk engine adjustment server 120 in the same server environment.

The risk engine adjustment server 120 is seen to include one or more communication interfaces 122, a set of processing units 124, and memory 126. The communication interfaces 122 include, for example, adapters, such as SCSI target adapters and network interface adapters, for converting electronic and/or optical signals received from the communications medium 150 to electronic form for use by the risk engine adjustment server 120. The set of processing units 124 include one or more processing chips and/or assemblies. The memory 126 includes both volatile memory (e.g., RAM), and non-volatile memory, such as one or more ROMs, disk drives, solid state drives, and the like. The set of processing units 124 and the memory 126 together form control circuitry, which is constructed and arranged to carry out various methods and functions as described herein.

The memory 126 includes a variety of software constructs realized in the form of executable instructions, such as a feedback anonymizer 130 and a risk engine adjustor 140. When the executable instructions are run by the set of processing units 124, the set of processing units 124 are caused to carry out the operations of the software constructs. Although certain software constructs are specifically shown and described, it is understood that the memory 126 typically includes many other software constructs, which are not shown, such as an operating system, various applications, processes, and daemons, for example. The memory 126 is also constructed and arranged to store various data, for example, the feedback 104 from human analysts provided for respective risk engines 110.

The feedback anonymizer 130 is a software construct configured to eliminate any reference to the entities that operate respective risk engines 110 from respective feedback 104. For example, feedback 104(1) may contain information identifying a bank that has predicted certain requests to access accounts as fraudulent. The bank may not wish to disclose information about such accounts or requests or even about its own identity. In Thus, the feedback anonymizer 130 renders feedback information in numerical form and without identifying information.

The risk engine adjuster 140 is configured to adjust the recipient risk engine 110(R) based on the received, anonymized feedback 106. More specifically, the risk engine adjuster 140 changes how the recipient risk engine 110(R) makes predictions of whether transaction requests are fraudulent. In the implementation described in FIG. 1, the risk engine adjuster 140 includes a risk engine accuracy estimator 142, a donor risk engine selector 144, and a risk engine combiner 146.

In an example, the risk engine accuracy estimator 142 is configured to provide a measure of accuracy indicating a likelihood that a transaction request predicted to be fraudulent by a risk engine, e.g., risk engine 110(1) is actually fraudulent. For example, a very simple measure of accuracy may take the form of a ratio of (a) a number of transaction requests predicted to be fraudulent that are actually fraudulent to (b) a total number of transaction requests. However, the risk engine accuracy estimator 142 may compute more sophisticated and/or reliable measures of accuracy, which will be discussed in detail below in connection with FIG. 3 and FIG. 4.

In an example, the donor risk engine selector 144 is configured to select a donor risk engine 110(1 . . . N) that provides the greatest measure of accuracy among all donor risk engines 110(1 . . . N). Upon selection, the risk engine combiner 146 may then adjust the recipient risk engine 110(R) by combining the feedback provided for the selected donor risk engine, e.g., 110(1), with the feedback provided for the recipient risk engine 110(R). Specific approaches to combining the feedback will be discussed below in connection with FIG. 5.

It should be understood that the feedback anonymizer 130 is not required to be in the risk engine adjustment server 120. Along these lines, in some arrangements, each of the donor risk engines 110 may have its own feedback anonymizer. For example, the feedback anonymizer in this case may simply send data that is output by the risk engine accuracy estimator 142 and input to the donor risk engine selector 144. In this case, each of the risk engines 110 may also have its own risk engine accuracy estimator.

During example operation, the donor risk engines 110(1), 110(2), . . . , 110(N) and the recipient risk engine 110(R) receive respective feedback 104(1), 104(2), . . . , 104(N) and 104(R) which indicates information about transaction requests previously predicted to be fraudulent that are confirmed to be fraudulent or non-fraudulent by human analysts. For example, each instance of feedback, e.g., 104(1), contains information identifying a transaction request that was previously predicted to be fraudulent by the risk engine 110(1) and a confirmation value indicating whether the identified transaction request is fraudulent or non-fraudulent. The risk engine 110(1) may receive and store the feedback 104(1).

Upon receiving the feedback 104, each risk engine 110 sends the feedback 104 to the risk engine adjustment server 120 over the communications medium 150. Upon receipt, the risk engine adjustment server 120 removes any identifying information from the feedback 104 and stores the feedback 106 in the memory 126.

At some point in time, the risk engine adjustment server 120 estimates the measure of accuracy for the feedback 104. In this context, accuracy refers to how often the prediction made by a risk engine that a transaction request is fraudulent is actually fraudulent. Along these lines, the risk engine adjustment server 120 computes a measure of accuracy of the feedback 104(1) provided for the donor risk engine 110(1) and for the other donor risk engines 110 as well as for the recipient risk engine 110(R).

The risk engine adjustment server 120 then selects the feedback 104 that has the greatest measure of accuracy. It should be understood that, as stored in the memory 126, the feedback is anonymized and is not readily associated with any particular entity or risk engine 110. However, the feedback 104 may still be grouped by the risk engine 110 for which it was provided. In this case, the risk engine adjustment server 120 selects the grouping of feedback 104 having the greatest measure of accuracy.

The risk engine combiner 146 performs the adjustment of the recipient risk engine 110(R) by combining (or replacing) the feedback 104(R) with the selected feedback, i.e., the feedback 104(s) provided for a donor feedback engine 110(s). In doing so, the risk engine adjustment server 120 combines elements of the risk model used by the selected risk engine 110(s) to predict fraudulence in transaction requests with elements of the risk model used by the recipient risk engine 110(R). The combination of the feedback 104(R) and 104(s) may be determined through experience or a machine learning process, although in many cases the combined feedback 104(R) and 104(s) are weighted equally.

Figure 2:
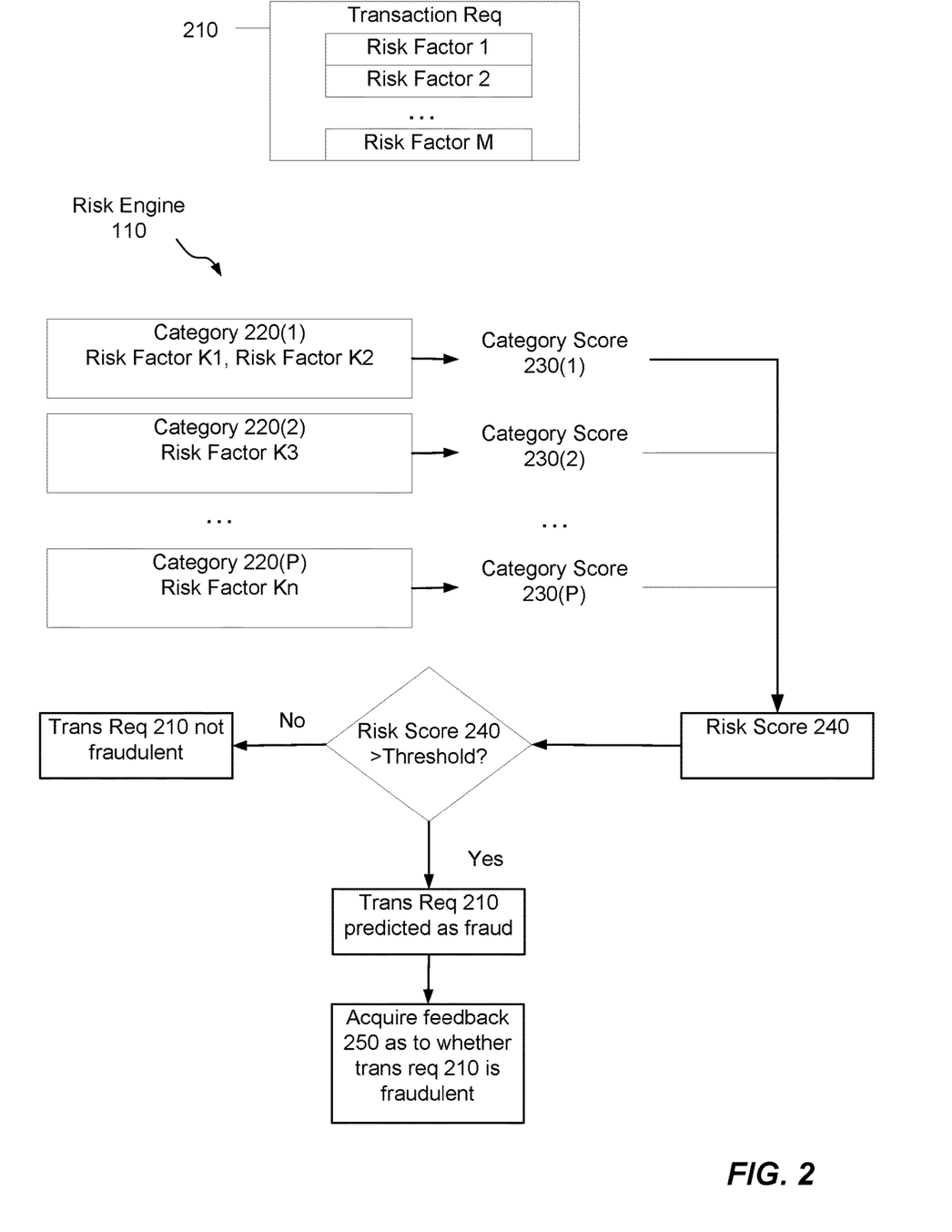
FIG. 2 is a flow chart illustrating an example generation of feedback within the electronic environment shown in FIG. 1.

FIG. 2 illustrates an example risk model used by a risk engine 110 to predict whether a transaction request 210 is fraudulent. As shown in FIG. 2, the transaction request 210 includes values of multiple risk factors, e.g., risk factor 1, risk factor 2, ..., risk factor M. For example, risk factor 1 may represent a country of origin of a transaction request, risk factor 2 may represent a time at which the transaction request was issued, and so on.

Each risk engine 110 models a set of categories 220. Each category represents a combination of risk factors. For example, category 220(1) may represent a combination of country of origin of a transaction request and time at which the transaction request was issued, category 220(2) may represent an amount of the transaction, and so on.

Upon receipt of a transaction request 210, the risk engine 110 computes a respective category score 230 for each category 220, e.g., category score 230(1) for category 220(1), and so on. The category score for a category 220 indicates a likelihood, based on that category alone, that the transaction request 210 is fraudulent. The category score 230 for a category 220 depends on the values of the risk factors in that category. For example, if the country of origin of the transaction request is the USA and the time of the transaction is 3 PM, then the category score 230(1) may be 200, while if the country of origin of the transaction request is Greenland and the time of the transaction is 3 AM, then the category score 230(1) may be 2000.

In an example, to predict whether the transaction request 210 is fraudulent, the risk engine 110 computes the category scores 230(1), ..., 230(P) for each category and combines the category scores 230(1), ..., 230(P) into a single risk score 240 of the transaction request 210. For example, the risk engine 110 may add the category scores 230(1 ... P) to produce the risk score 240. The risk score 240 of the transaction request 210 indicates whether the transaction request 110 is fraudulent.

In an example, to convert the risk score 240 into a prediction of fraudulence, the risk engine 110 compares the risk score 240 to a risk score threshold, above which the transaction request 210 is predicted to be fraudulent and below which the transaction request is predicted to be non-fraudulent. For example, the risk score threshold may be based on the top five percentile of risk scores generated over the previous week. If the transaction request 210 is predicted to be fraudulent according to the risk engine 110, the risk engine 110 then seeks feedback 250 confirming whether the transaction request 210 is actually fraudulent.

Figure 3:
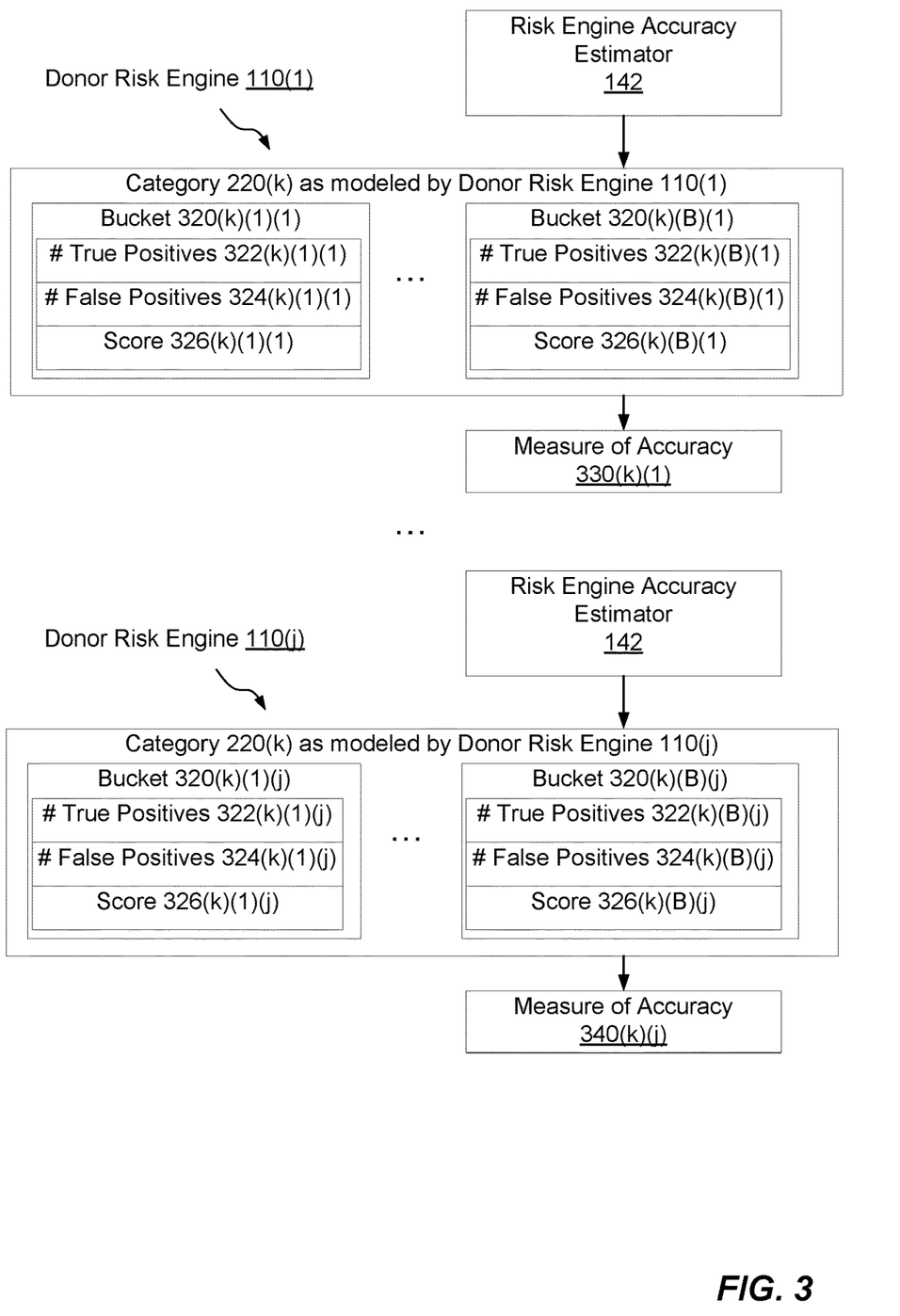
FIG. 3 is a block diagram illustrating an example set of buckets within categories as modeled by respective donor risk engines within the electronic environment shown in FIG. 1.

FIG. 3 illustrates an example process of generating measures of accuracy on a per-category basis. In this example, each risk engine 110 models the same categories. Specifically, continuing the example from FIG. 2, each risk engine 110 models category 220(1), which is a combination of country of origin of a transaction request and time at which the transaction request was issued, category 220(2) which represents an amount of the transaction, and so on.

Each category 220 includes B buckets 320. Each of the buckets 320 of a category 220 represents a range of values of the risk factors of that category 220. For example, donor risk engine 110(1) models a category 220(k), which represents country of origin and transaction amount. Category 220(k) as modeled by donor risk engine 110(1) includes buckets 320(k)(1 ... B)(1), which represent various values of the country of origin and transaction amount. For example, bucket 320(k)(1)(1) may represent transaction requests originating from the USA and involving amounts less than $500, while bucket 320(k)(B)(1) may represent transaction requests originating from Russia and involving amounts greater than $10,000.

It should be understood that the B buckets of category 220(k) modeled by donor risk engine 110(j) are assumed to be the same as the B buckets of category 220(k) modeled by donor risk engine 110(1), or any other donor risk engine 110. However, in arrangements where the buckets of the category 220(k) are the same (or sufficiently similar) for a donor and the recipient, then the category 220(k) can be excluded from adjustment.

Each bucket 320(k)(1 ... B)(1) of category 220(k) as modeled by donor risk engine 110(1) includes quantities from which a measure of accuracy may be derived. As illustrated in FIG. 3, the bucket 320(k)(1)(1), for example, includes a number of true positives (TP) 322(k)(1)(1) and a number of false positives (FP) 324(k)(1)(1). TP is equal to the number of transaction requests predicted to be fraudulent and confirmed to be fraudulent from the feedback provided by human analysts and FP is equal to the number of transaction requests predicted to be fraudulent and confirmed to be non-fraudulent from that feedback. Thus, the feedback provided by the human analysts is directed to specific buckets of categories.

The bucket 320(k)(1)(1) also includes a score 326(k)(1)(1) that determines the category score for transaction requests received by donor risk engine 110(1). For example, if a transaction request received by donor risk engine 110(1) originates from the USA and involves $200, then the category score for category 220(k) as modeled by the donor risk engine 110(1) is equal to the score 326(k)(1)(1).

In general, the score S may be computed in terms of TP and FP for each bucket of a category. In one example implementation, the score $S_{kj}$ of the jth bucket 326(k)(j)(1) of category 220(k) is computed as follows:

$$S_{kj} = 1000 \log_{10}\left(\frac{TP_{kj}\rho_k + m}{FP_{kj} + m}\right),$$

where $TP_{kj}$ is the true positive for the jth bucket 326(k)(j)(1) of category 220(k), $FP_{kj}$ is the false positive for the jth bucket 326(k)(j)(1) of category 220(k), $$\rho_k = \frac{\Sigma_j FP_{kj}}{\Sigma_j TP_{kj}},$$

and m is a fixed number between 10 and 20.

The TP and FP of each bucket of a category 220(k) provide a measure of accuracy 330(k)(1) of that category as modeled by the donor risk engine 110(1). Thus, in this example, selecting the feedback used to adjust the recipient risk engine 110(R) involves selecting the donor risk engine 110(s) that, for a given category 220(k), has the greatest (or optimal) value of the measure of accuracy 330(k) over all donor risk engines 110(1 ... N). There may be a different donor risk engine 110(1 ... N) selected for each category 220 and the risk engine adjustment server 120 adjusts the recipient risk engine 110(R) on a per-category basis.

Figure 4:
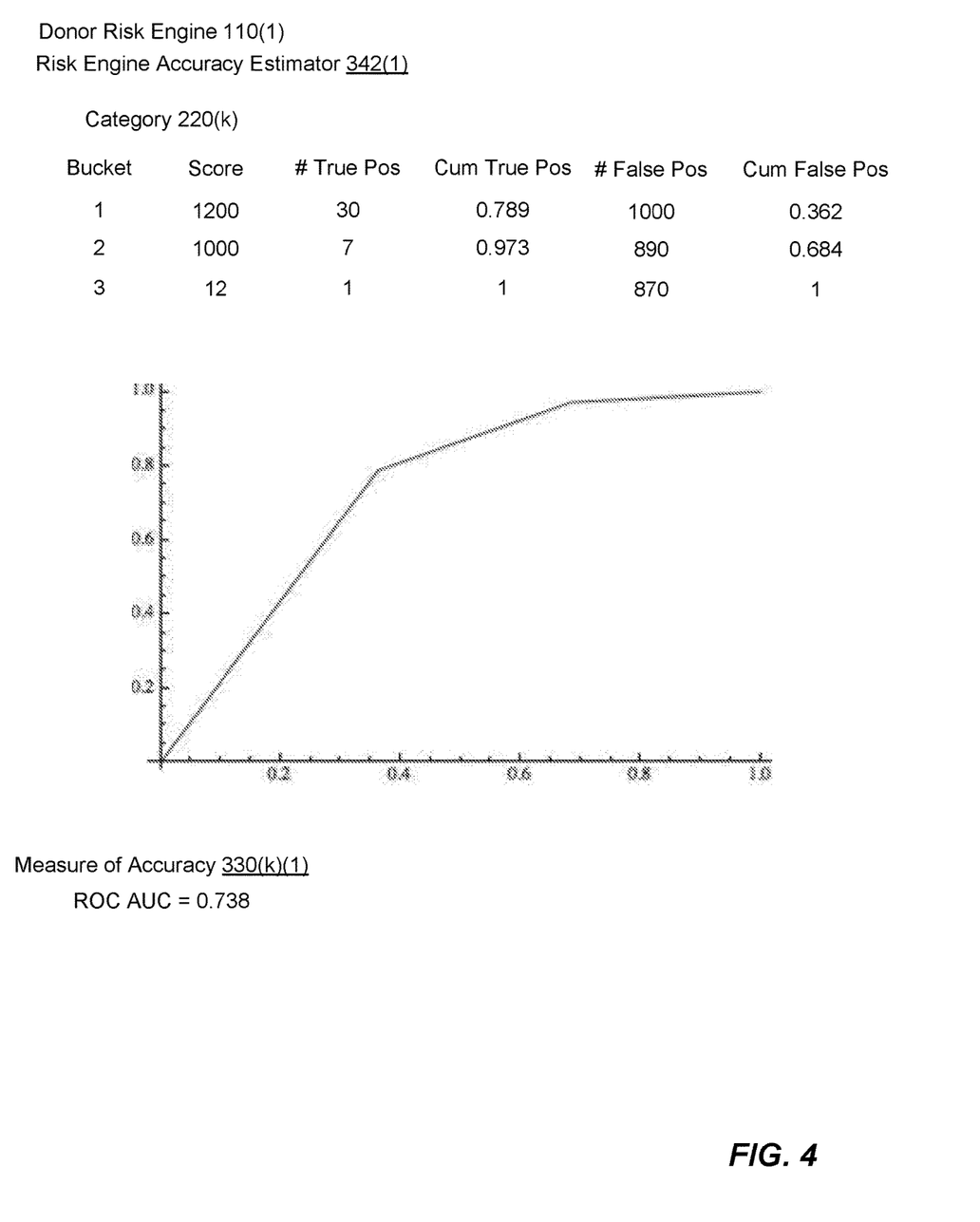
FIG. 4 is a diagram illustrating an example estimation of a measure of accuracy of a category as modeled by a risk engine within the electronic environment shown in FIG. 1.

FIG. 4 illustrates an example computation of the measure of accuracy 330(k)(1) of category 220(k) as modeled by donor risk engine 110(1) using the risk engine accuracy estimator 142 for donor risk engine 110(1). In this example, the category 220(k) has three (B=3) buckets. The first bucket 320(k)(1)(1) has TP=7, FP=890, and BS=1000, the second bucket 320(k)(2)(1) has TP=30, FP=1000, and BS=1200, and the third bucket 320(k)(3)(1) has TP=1, FP=870, and BS=12.

In this example computation, the risk engine accuracy estimator 142 creates a table having three rows, one for each bucket and sorts the rows according to decreasing bucket score as illustrated in FIG. 4. The table also contains six (6) columns: a bucket identifier, bucket score, TP, FP, as well as a cumulative TP (CTP) and a cumulative FP (CFP). For example, the total number of TP and FP in the category 220(k) as modeled by donor risk engine 110(1) is equal to 38 and 2760, respectively. Thus, in the first row, CTP=30/38 and CFP=1000/2760; in the second row, CTP=37/38 and CFP=1890/2760 and so on.

In this example, the risk engine accuracy estimator 142 then generates, as a receiver operating characteristic (ROC), a discrete line plot of CTP vs. CFP, i.e., CFP as the abscissa and CTP as the ordinate. (A discrete line plot is a plot of discrete points joined by line segments, as illustrated in FIG. 4.). The risk engine accuracy estimator 342(1) then produces, as the measure of accuracy 330(k)(1), the area under the curve (AUC) of the ROC, which in this case is approximately 0.738.

For each category 220, the donor risk engine selector 144 selects the donor risk engine 110 that has the largest value of the AUC. Thus, for example, donor risk engine selector 144 may select donor risk engine 110(2) as having the largest AUC for category 220(1) across all donor risk engines 110(1 ... N) but then may select donor risk engine 110(N) as having the largest AUC for category 220(2) across all donor risk engines 110(1 ... N). The risk engine adjustment server 120 then performs an adjustment to recipient risk engine 110(R) on a per-category basis.

Figure 5:
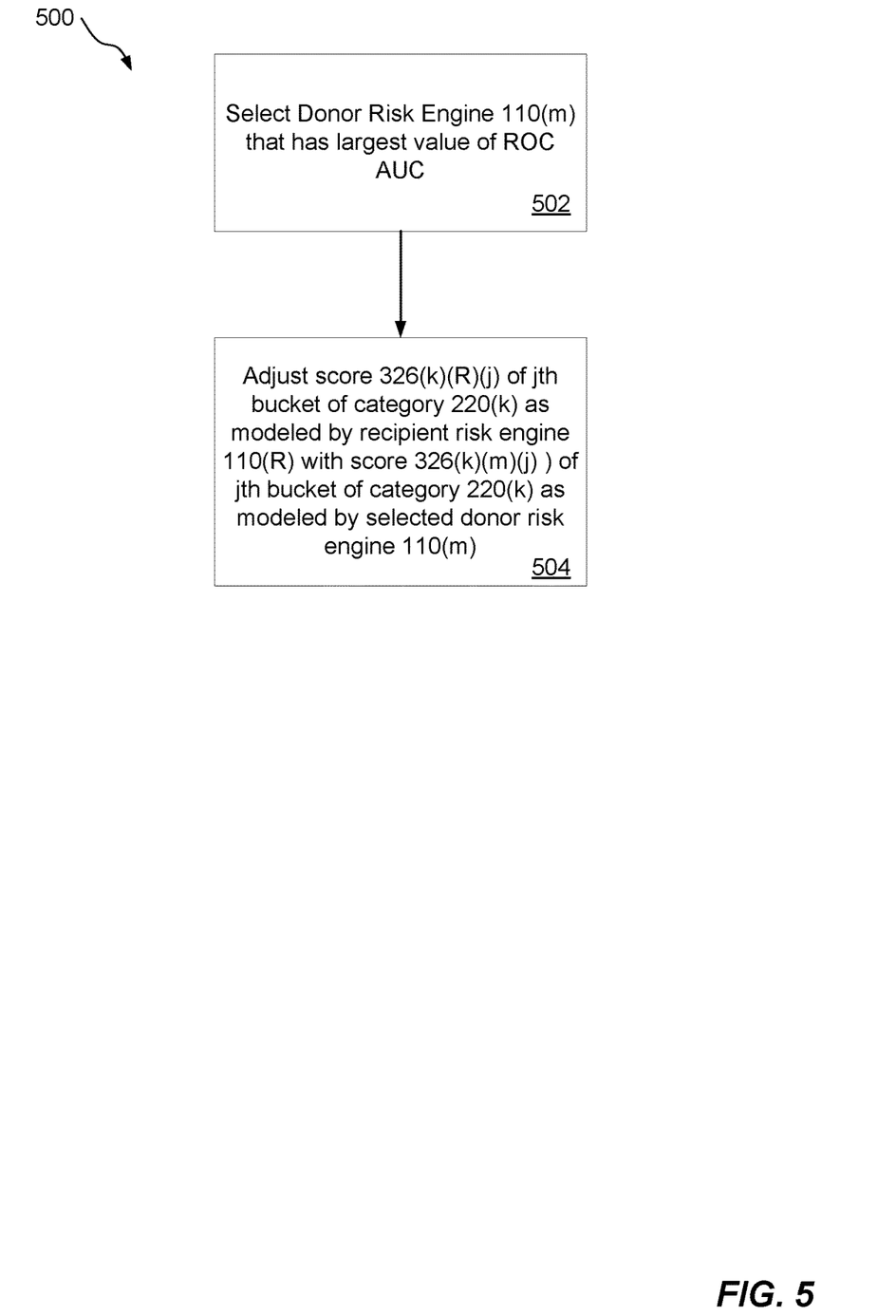
FIG. 5 is a flow chart illustrating an example adjustment of a recipient risk engine carried out within the electronic environment shown in FIG. 1.

FIG. 5 illustrates an example process 500 of such a per-category adjustment of the recipient risk engine 110(R). At 502, the donor risk engine selector 144 selects a donor risk engine 110(m) that has the largest AUC for a given category 220(k) as described above. At 504, the risk engine combiner 146 replaces the score 326(k)(j)(R) of each bucket 320(k)(j)(R) with the score 326(k)(j)(m) of the corresponding bucket 320(k)(j)(m). Accordingly, the adjusted recipient risk engine 110(R) subsequently generates the same category scores as the selected donor risk engine 110(m) for the category 220(k).

Replacement of bucket scores across a given category is not the only option. In other arrangements, the risk engine combiner 146 performs a weighted average of the score 326(k)(j)(R) of each bucket 320(k)(j)(R) and the score 326(k)(j)(m) of the corresponding bucket 320(k)(j)(m). The relative weight of each bucket may be determined through experience or a machine learning process, although in many cases each of the scores are weighted equally.

It should be understood that the above example applies to the case where a donor risk engine 110(1 ... N) has a higher AUC than the recipient risk engine 110(R) for each category 220. In the case where the recipient risk engine 110(R) has a higher AUC than each donor risk engine 110(1 ... N) for a category 220(k), then there is no adjustment performed to the bucket scores for that category as modeled by the recipient risk engine 110(R).

Figure 6:
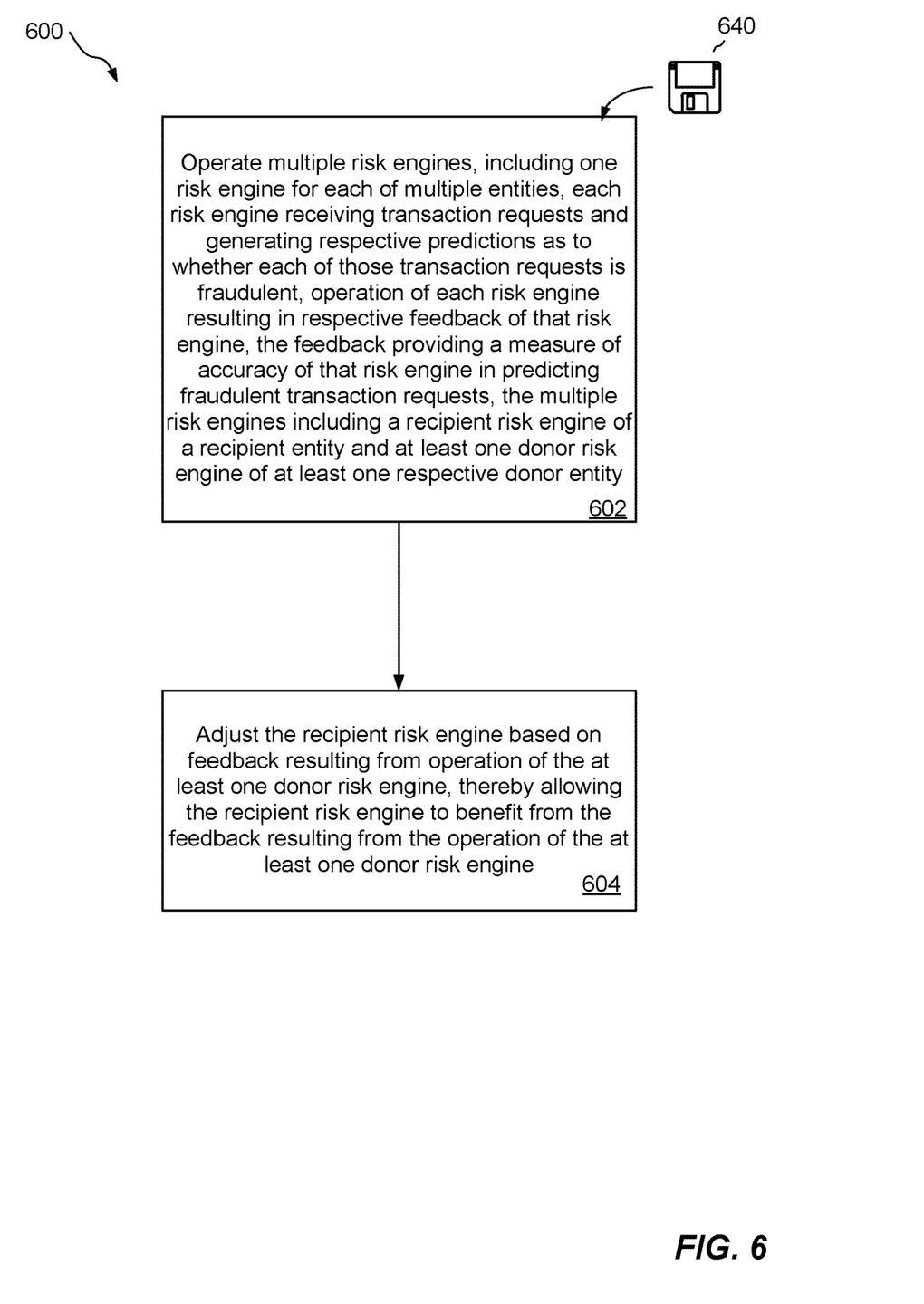
FIG. 6 is a flow chart illustrating an example method of processing the write requests within the electronic environment shown in FIG. 1.

FIG. 6 illustrates a method 600 of performing risk-based authentication. The method 600 may be performed by the software constructs described in connection with FIG. 1, which reside in the memory 126 of the risk engine adjustment server 120 and are run by the processing units 124.

At 602, multiple risk engines are operated, including one risk engine for each of multiple entities, each risk engine receiving transaction requests and generating respective predictions as to whether each of those transaction requests is fraudulent, operation of each risk engine resulting in respective feedback of that risk engine, the feedback providing a measure of accuracy of that risk engine in predicting fraudulent transaction requests, the multiple risk engines including a recipient risk engine of a recipient entity and at least one donor risk engine of at least one respective donor entity. In the example illustrated in FIG. 1, each risk engine 110 is operated by a separate entity. The feedback 104 received by each risk engine 110 changes the TP and FP of each bucket 320 of each category 220 as modeled by that risk engine 110. Thus, the feedback 104 as received by the risk engine adjustment server 120 may take the form of updated TP and FP for each bucket 320 of each category 220 as modeled by that risk engine 110.

At 604, the recipient risk engine is adjusted based on feedback resulting from operation of the at least one donor risk engine, thereby allowing the recipient risk engine to benefit from the feedback resulting from the operation of the at least one donor risk engine. As described in the above example, the risk engine accuracy estimator 142 computes the AUC for each category of each risk engine 110 and the donor risk engine selector 144 selects the donor risk engine 110(1 ... N) having the largest AUC for a given category, on a per-category basis. Then, for each category, the risk engine combiner 146 adjusts the recipient risk engine 110(R) on that per-category basis and operates with new settings going forward.

Improved techniques have been described for performing risk-based authentication. The improved techniques involve adjusting a risk engine used by a recipient entity based on feedback acquired from multiple entities. Advantageously, the improved techniques make possible for a risk engine to increase its prediction accuracy even when its own feedback is limited.

Having described certain embodiments, numerous alternate embodiments or variations can be made. For example, the measure of accuracy used in the above discussion involved the AUC of each category. However, there are other measures of accuracy that one may employ. In one example, the risk engine accuracy estimator 142 may use a monetary-savings-based measure rather than—or in addition to—the TP/FP based measure described above.

Further, as mentioned above, the example illustrated in FIG. 1 shows the risk engines 110 being operated separately. However, in some arrangements, the risk engines may all (or partially) be operated by a single, third-party entity.

One should appreciate that the above-described techniques do not merely process information to perform risk-based authentication. Rather, the disclosed techniques involve an improvement to an industrial process, namely providing security to at least one entity based on feedback from other entities. In some arrangements, such security is made feasible through anonymization of the feedback from the other entities.

Further, with the above-described techniques, other advantages are available as well such as reduced silent (i.e., learning) periods, conditional and per-category learning, and so on. Such operations provide an improvement to the operation of the machines on which the techniques are performed by speeding the process of providing the security on the machines.

In some arrangements, the risk engine adjustment server 120 is implemented by a set of cores or other types of control/processing circuitry running software. In such arrangements, the software instructions can be delivered, within the risk engine adjustment server 120, in the form of a computer program product 640. Alternative examples of suitable computer readable storage media include tangible articles of manufacture and apparatus such as CD-ROM, flash memory, disk memory, tape memory, and the like.

While various embodiments of the invention have been particularly shown and described, it will be understood by those skilled in the art that various changes in form and details may be made therein without departing from the spirit and scope of the invention as defined by the appended claims.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants, is considered to exist within this document.

What is claimed is:

1. A method of performing risk-based authentication, the method comprising:
   operating multiple risk engines, including one risk engine for each of multiple entities,
      each risk engine receiving transaction requests and generating respective predictions as to whether each of those transaction requests is fraudulent,
      operation of each risk engine resulting in respective feedback of that risk engine,
      the feedback providing a measure of accuracy of that risk engine in predicting fraudulent transaction requests,
      the multiple risk engines including a recipient risk engine of an authentication system operated by a recipient entity and at least one donor risk engine of at least one respective donor entity; and
   adjusting the recipient risk engine based on feedback resulting from operation of the at least one donor risk engine,
   thereby allowing the recipient risk engine to benefit from the feedback resulting from the operation of the at least one donor risk engine, enabling the authentication system of the recipient entity to make more accurate predictions as to whether transaction requests processed by the authentication system are fraudulent,
   wherein the method further comprises:
      receiving, by the recipient risk engine, the feedback of the multiple risk engines, the feedback being anonymized feedback that prevents the recipient entity from identifying the entities from which the received feedback results, and
      prior to adjusting the recipient risk engine, selecting feedback to be applied when adjusting the recipient risk engine from among feedback resulting from operation of the multiple risk engines, wherein selecting the feedback is based on the measures of accuracy provided by the feedback from the multiple risk engines,
   wherein each of the multiple risk engines effects modeling of a set of categories, each category representing a respective aspect of transaction requests,
   wherein the feedback of each risk engine is provided on a per-category basis, the feedback for each category having a respective measure of accuracy,
   wherein selecting the feedback is performed on a per-category basis based on the measures of accuracy for each category across the multiple risk engines, and
   wherein operating the multiple risk engines includes, for each of the multiple risk engines:
      in response to receiving a transaction request, generating, for each category modeled by that risk engine, a respective category score for that transaction request, the category score indicating a likelihood, based on that category alone, that the transaction request is fraudulent; and
      outputting a risk score for that risk engine based on the category scores generated by that risk engine across the set of categories, the risk score indicating whether the received transaction request is fraudulent,
   wherein generating the measure of accuracy of a category for a risk engine is based on an AUC (area under the curve) of a discrete line plot of cumulative true positives (CTP) versus cumulative false positives (CFP) for the respective category and risk engine, and wherein selecting the feedback for a particular category is based on a selected risk engine that has a largest AUC for the particular category.

2. A method as in claim 1, wherein adjusting the recipient risk engine based on the feedback resulting from the operation of the at least one donor risk engine includes, for at least one of the categories:
   selecting a donor risk engine based on the selected feedback for that category; and
   combining the generated category score of the selected donor risk engine for that category and the generated category score of the recipient risk engine for that category.

3. A method as in claim 2, further comprising, upon receiving, a transaction request by a risk engine, identifying multiple risk factors from the transaction request,
   wherein each of the risk engines models the set of categories as a combination of individual risk factors,
   wherein each category modeled by each of the multiple risk engines includes multiple buckets, each bucket (i) representing respective values of the combination of risk factors and (ii) providing a respective bucket score,
   wherein generating the category score for a category modeled by the risk engine includes:
      selecting a bucket of the category based on the values of the risk factors of the transaction request; and
      producing, as the category score, the score of the selected bucket.

4. A method as in claim 3, wherein combining the generated category score of the selected donor risk engine for a category and the generated category score of the recipient risk engine for the category includes combining the score of each bucket of the category modeled by the selected donor risk engine and the score of each corresponding bucket of the category modeled by the recipient risk engine.

5. A method as in claim 4, wherein combining the score of each bucket of the category modeled by the selected donor risk engine and the score of each corresponding bucket of the category modeled by the recipient risk engine includes generating a weighted average of the score of that bucket of the category modeled by the selected donor risk engine and the score of a corresponding bucket of the category modeled by the recipient risk engine.

6. A method as in claim 5, wherein generating a weighted average of the score of each bucket of the category modeled by the selected donor risk engine and the score of the corresponding bucket of the category modeled by the recipient risk engine includes replacing the score of the bucket of the category modeled by the recipient risk engine with the score of the corresponding bucket of the category modeled by the selected donor risk engine.

7. A method as in claim 3, wherein each of the multiple buckets of a category modeled by a risk engine further includes (i) a number of fraud markings, (ii) a number of non-fraud markings, a fraud marking indicating that a transaction request predicted to be fraudulent by the risk engine is fraudulent, a non-fraud marking indicating that a transaction request predicted to be fraudulent by the risk engine is not fraudulent,
   wherein the method further comprises computing the score of a bucket of the category based on the number of fraud markings of the bucket and the number of non-fraud markings of the bucket.

8. A method as in claim 7, wherein selecting the donor risk engine includes, for each of the categories:
   for each of the at least one donor risk engine implementing that category:
      sorting the number of fraud markings and the number of non-fraud markings of each of the set of buckets of that category in descending order by the score of that bucket to form a sorted bucket table;
      generating cumulative numbers of fraud markings and cumulative numbers of non-fraud markings from the sorted bucket table;
      generating ratios of the cumulative numbers of fraud markings to the total number of fraud markings in that category to form fraud rates of that category;
      generating ratios of the cumulative numbers of non-fraud markings to the total number of fraud markings in that category to form non-fraud rates of that category;
      forming a receiver operating characteristic (ROC) curve by plotting the fraud rates versus the non-fraud rates of that category; and
      producing, as the contribution to the measure of accuracy provided by that category, the area under the ROC curve (AUC); and
      locating, as the selected donor risk engine implementing that category, the donor risk engine for which the largest AUC was produced.

9. The method of claim 1, wherein generating the measure of accuracy of a category for a risk engine includes:
   creating a table having a respective row for each of multiple buckets provided for the respective category;
   sorting the table based on bucket scores of the buckets;
   constructing a discrete line plot of CTP versus CFP wherein each point in the discrete line plot corresponds to a respective row of the table; and
   generating the measure of accuracy as the AUC (area under the curve) of the discrete line plot.

10. The method of claim 9, further comprising computing bucket scores for the multiple buckets based on numbers of TPs (true positives) and numbers of FPs (false positives) for the respective buckets.

11. A computer program product including a non-transitory, computer-readable storage medium which stores executable code, which when executed by a computer, causes the computer to perform a method of performing risk-based authentication, the method comprising:
   operating multiple risk engines, including one risk engine for each of multiple entities,
      each risk engine receiving transaction requests and generating respective predictions as to whether each of those transaction requests is fraudulent,
      operation of each risk engine resulting in respective feedback of that risk engine,
      the feedback providing a measure of accuracy of that risk engine in predicting fraudulent transaction requests,
      the multiple risk engines including a recipient risk engine of an authentication system operated by a recipient entity and at least one donor risk engine of at least one respective donor entity; and
   adjusting the recipient risk engine based on feedback resulting from operation of the at least one donor risk engine,
      thereby allowing the recipient risk engine to benefit from the feedback resulting from the operation of the at least one donor risk engine, enabling the authentication system of the recipient entity to make more accurate predictions as to whether transaction requests processed by the authentication system are fraudulent,
   wherein the method further comprises, prior to adjusting the recipient risk engine, selecting feedback to be applied when adjusting the recipient risk engine from among feedback resulting from operation of the multiple risk engines, wherein selecting the feedback is based on the measures of accuracy provided by the feedback from the multiple risk engines,
   wherein each of the multiple risk engines effects modeling of a set of categories, each category representing a respective aspect of transaction requests,
   wherein the feedback of each risk engine is provided on a per-category basis, the feedback for each category having a respective measure of accuracy,
   wherein selecting the feedback is performed on a per-category basis based on the measures of accuracy for each category across the multiple risk engines, and
   wherein operating the multiple risk engines includes, for each of the multiple risk engines:
      in response to receiving a transaction request, generating, for each category modeled by that risk engine, a respective category score for that transaction request, the category score indicating a likelihood, based on that category alone, that the transaction request is fraudulent; and
      outputting a risk score for that risk engine based on the category scores generated by that risk engine across the set of categories, the risk score indicating whether the received transaction request is fraudulent,
      wherein generating the measure of accuracy of a category for a risk engine is based on an AUC (area under the curve) of a discrete line plot of cumulative true positives (CTP) versus cumulative false positives (CFP) for the respective category and risk engine, and wherein selecting the feedback for a particular category is based on a selected risk engine that has a largest AUC for the particular category.

12. A computer program product as in claim 11, wherein adjusting the recipient risk engine based on the feedback resulting from the operation of the at least one donor risk engine includes, for at least one of the categories:
   selecting a donor risk engine based on the selected feedback for that category; and
   combining the generated category score of the selected donor risk engine for that category and the generated category score of the recipient risk engine for that category.

13. A computer program product as in claim 12, wherein the method further comprises, upon receiving a transaction request by a risk engine, identifying multiple risk factors from the transaction request,
   wherein each of the risk engines models the set of categories as a combination of individual risk factors,
   wherein each category modeled by each of the multiple risk engines includes multiple buckets, each bucket (i) representing respective values of the combination of risk factors and (ii) providing a respective bucket score,
   wherein generating the category score for a category modeled by the risk engine includes:
      selecting a bucket of the category based on the values of the risk factors of the transaction request; and
      producing, as the category score, the score of the selected bucket, and
   wherein combining the generated category score of the selected donor risk engine for a category and the generated category score of the recipient risk engine for the category includes combining the score of each bucket of the category modeled by the selected donor risk engine and the score of each corresponding bucket of the category modeled by the recipient risk engine.

14. A computer program product as in claim 13, wherein adjusting the recipient risk engine based on the feedback resulting from the operation of the at least one donor risk engine includes, for at least one of the categories, combining the generated category score of the selected donor risk engine for that category and the generated category score of the recipient risk engine for that category.

15. An electronic system constructed and arranged to perform risk-based authentication, the electronic system including:
   a network interface;
   memory; and
   controlling circuitry couple to the memory, the controlling circuitry being constructed and arranged to:
      operate multiple risk engines, including one risk engine for each of multiple entities,
         each risk engine receiving transaction requests and generating respective predictions as to whether each of those transaction requests is fraudulent, operation of each risk engine resulting in respective feedback of that risk engine,
         the feedback providing a measure of accuracy of that risk engine in predicting fraudulent transaction requests,
      the multiple risk engines including a recipient risk engine of an authentication system operated by a recipient entity and at least one donor risk engine of at least one respective donor entity; and
      adjust the recipient risk engine based on feedback resulting from operation of the at least one donor risk engine,
         thereby allowing the recipient risk engine to benefit from the feedback resulting from the operation of the at least one donor risk engine, enabling the authentication system of the recipient entity to make more accurate predictions as to whether transaction requests processed by the authentication system are fraudulent,
   wherein the controlling circuitry is further constructed and arranged to, prior to adjusting the recipient risk engine, select feedback to be applied when adjusting the recipient risk engine from among feedback resulting from operation of the multiple risk engines, wherein selection of the feedback is based on the measures of accuracy provided by the feedback from the multiple risk engines,
   wherein each of the multiple risk engines effects modeling of a set of categories, each category representing a respective aspect of transaction requests,
   wherein the feedback of each risk engine is provided on a per-category basis, the feedback for each category having a respective measure of accuracy,
   wherein the controlling circuitry constructed and arranged to select the feedback is performed on a per-category basis based on the measures of accuracy for each category across the multiple risk engines, and
   wherein the controlling circuitry constructed and arranged to operate the multiple risk engines is further constructed and arranged to, for each of the multiple risk engines:
      in response to receiving a transaction request, generate, for each category modeled by that risk engine, a respective category score for that transaction request, the category score indicating a likelihood, based on that category alone, that the transaction request is fraudulent; and
      output a risk score for that risk engine based on the category scores generated by that risk engine across the set of categories, the risk score indicating whether the received transaction request is fraudulent,
   wherein the controlling circuitry constructed and arranged to generate the measure of accuracy of a category for a risk engine is based on an AUC (area under the curve) of a discrete line plot of cumulative true positives (CTP) versus cumulative false positives (CFP) for the respective category and risk engine, and wherein the controlling circuitry constructed and arranged to select the feedback for a particular category is based on a selected risk engine that has a largest AUC for the particular category.

* * * * *